US009325757B2

(12) United States Patent
Uhlig et al.

(10) Patent No.: US 9,325,757 B2
(45) Date of Patent: Apr. 26, 2016

(54) METHODS AND SYSTEMS FOR FAULT-TOLERANT DISTRIBUTED STREAM PROCESSING

(75) Inventors: Volkmar Uhlig, Chicago, IL (US); Jan Stoess, Karlsruhe (DE)

(73) Assignee: ADELLO INC., Redwood, CA (US)

( * ) Notice: Subject to any disclaimer, the term of this patent is extended or adjusted under 35 U.S.C. 154(b) by 85 days.

(21) Appl. No.: 13/308,037

(22) Filed: Nov. 30, 2011

(65) Prior Publication Data

US 2012/0137164 A1    May 31, 2012

Related U.S. Application Data

(60) Provisional application No. 61/418,371, filed on Nov. 30, 2010, provisional application No. 61/418,221, filed on Nov. 30, 2010.

(51) Int. Cl.
| | |
|---|---|
| *G06F 11/00* | (2006.01) |
| *H04L 29/06* | (2006.01) |
| *G06F 9/50* | (2006.01) |
| *G06F 9/00* | (2006.01) |
| *H04L 29/08* | (2006.01) |

(52) U.S. Cl.
CPC *H04L 65/60* (2013.01); *G06F 9/00* (2013.01); *G06F 9/5083* (2013.01); *G06F 11/00* (2013.01); *G06F 11/004* (2013.01); *H04L 67/10* (2013.01)

(58) Field of Classification Search
USPC .................................. 714/4.1, 4.11, 15, 20
See application file for complete search history.

(56) References Cited

U.S. PATENT DOCUMENTS

| | | | | |
|---|---|---|---|---|
| 5,951,695 | A  * | 9/1999 | Kolovson | 714/16 |
| 6,078,999 | A  * | 6/2000 | Raju et al. | 711/161 |
| 7,065,540 | B2 * | 6/2006 | Chandrasekaran et al. | 707/674 |
| 7,921,328 | B1 * | 4/2011 | Gulati et al. | 714/6.23 |
| 8,276,019 | B2 * | 9/2012 | Watanabe et al. | 714/20 |
| 2005/0193229 | A1 * | 9/2005 | Garg et al. | 714/4 |

* cited by examiner

*Primary Examiner* — Yolanda L Wilson
(74) *Attorney, Agent, or Firm* — David R. Stevens; Stevens Law Group

(57) ABSTRACT

A method of achieving fault tolerance in a distributed stream processing system organized as a directed acyclic graph includes the initial step of managing a stream process within the distributed stream processing system including one or more operators. The one or more operators of the stream process are communicatively associated with one or more downstream operators. The method includes the steps of maintaining one or more data copies of a processing state of the one or more operators until the one or more data copies can be safely discarded, notifying the one or more operators when it is safe to discard at least one of the at least one of the one or more data copies of the processing state; and using an identifier to denote the data copy of the processing state to be safely discarded.

19 Claims, 10 Drawing Sheets

METHODS AND SYSTEMS FOR FAULT-TOLERANT DISTRIBUTED STREAM PROCESSING

CROSS-REFERENCE TO RELATED APPLICATIONS

This patent application claims priority to, and the benefit of, U.S. Provisional Application Ser. No. 61/418,221 filed on Nov. 30, 2010, entitled "FAULT-TOLERANT DISTRIBUTED STREAM PROCESSING THROUGH A REVERSE SUBSCRIBER MODEL", and Application Ser. No. 61/418,371 filed on Nov. 30, 2010, entitled "METHOD AND SYSTEM FOR ONLINE RECONFIGURATION AND REPARTITIONING OF A PARALLEL DISTRIBUTED STREAM PROCESS", the disclosures of which are herein incorporated by reference in their entireties.

BACKGROUND

1. Technical Field

The present disclosure relates to data streaming and, more particularly, to methods and systems for fault-tolerant distributed stream processing.

2. Discussion of Related Art

Real-time data processing systems have been developed for a variety of uses and applications. Distributed computer systems have been widely employed to run jobs on multiple machines or processing nodes, which may be co-located within a single cluster or geographically distributed over wide areas, where some jobs run over long periods of time. During the lifetime of a job, machines and infrastructure, e.g., various hardware and software, can arbitrarily fail, yet many stream processing applications require results to be continually produced, which means that the system may need to continue operation and make forward progress in the computation even after one or more components and/or processes have failed. In spite of advances in middleware, data processing on highly distributed, and often faulty, infrastructure can be challenging. In principle, the underlying middleware should restart or reschedule tasks after transparently recovering from the failure events such that processing continues where the failed job left off.

A variety of fault-tolerant techniques and systems for processing data streams, even in the face of high and variable input data rates, have been developed, e.g., to meet the demands of real-time applications. Some systems implementing fault-resilient processing break up a computational job into many tasks which can be processed independently to achieve desired reliability. Each task has a defined input set and generates an output set. A job coordinator ensures that all tasks are executed at least once and all results are computed before the next, dependent job gets started. An example of a system and method for large-scale data processing including operations for automatically handling fault-recovery is MapReduce, disclosed in U.S. Pat. No. 7,650,331, entitled "System and method for efficient large-scale data processing".

In a streaming environment with a distributed computational model, data is continuously injected into a set of operators (e.g., filters, aggregates, and correlations) which then produce result sets that are either sent to applications or other nodes for additional processing. When a stream goes from one node to another, the nodes are generally referred to as upstream and downstream neighbors. Typically, for efficiency reasons, data cannot be persisted to disk such that all operations can be restarted. In the event of a machine or process failure, the current state of the operator is lost and needs to be recovered through other means than persistent storage to continue processing.

A common approach to achieve fault tolerance involves the introduction of a redundant operator, which must be located on a distinct machine to survive a node failure. Using this approach, all data pushed from operator to operator must be replicated, and successful receipt of data must be confirmed to achieve fault tolerance. A replication-based approach to fault-tolerant distributed stream processing generally requires at least twice the computational resources and network bandwidth in the common mode of operation. The job scheduler needs to be aware of the peers and must not place the peers on the same node, which generally increases the complexity of the job scheduler. In the case of large systems, a replication-based approach scales poorly with increasing cluster size due to limitations of the switching fabric. Frequently-communicating nodes should be placed in proximity, and yet, for reliability reasons, should use different switching infrastructure. To achieve that, a full replication approach places substantial burden on the switching infrastructure.

In distributed stream processing systems, a node failure or switch outage may cause failure of one or more operators in the stream, which, in turn, may fail the stream process. The system must consider all streams of a node in the event of a node failure. One common way of solving the reliability issue is by introducing operator redundancy, such as with a primary and secondary operator. If the primary operator fails, then the secondary operator takes over the operation and the infrastructure creates a new backup replica. If the secondary fails, then the system just creates a fresh replica. The system needs to keep primary and secondary in lock-step to allow take-over in case of failure.

SUMMARY

According to one aspect, a method of achieving fault tolerance in a distributed stream processing system organized as a directed acyclic graph is provided. The method includes the initial step of managing a stream process within the distributed stream processing system including one or more operators. The one or more operators of the stream process are communicatively associated with one or more downstream operators. The method includes the steps of maintaining one or more data copies of a processing state of the one or more operators until the one or more data copies can be safely discarded, notifying the one or more operators when it is safe to discard at least one of the at least one of the one or more data copies of the processing state; and using an identifier to denote the data copy of the processing state to be safely discarded.

BRIEF DESCRIPTION OF THE DRAWINGS

Objects and features of the presently-disclosed methods and systems for fault-tolerant distributed stream processing will become apparent to those of ordinary skill in the art when descriptions of various embodiments thereof are read with reference to the accompanying drawings, of which.

DETAILED DESCRIPTION

Figure 1:
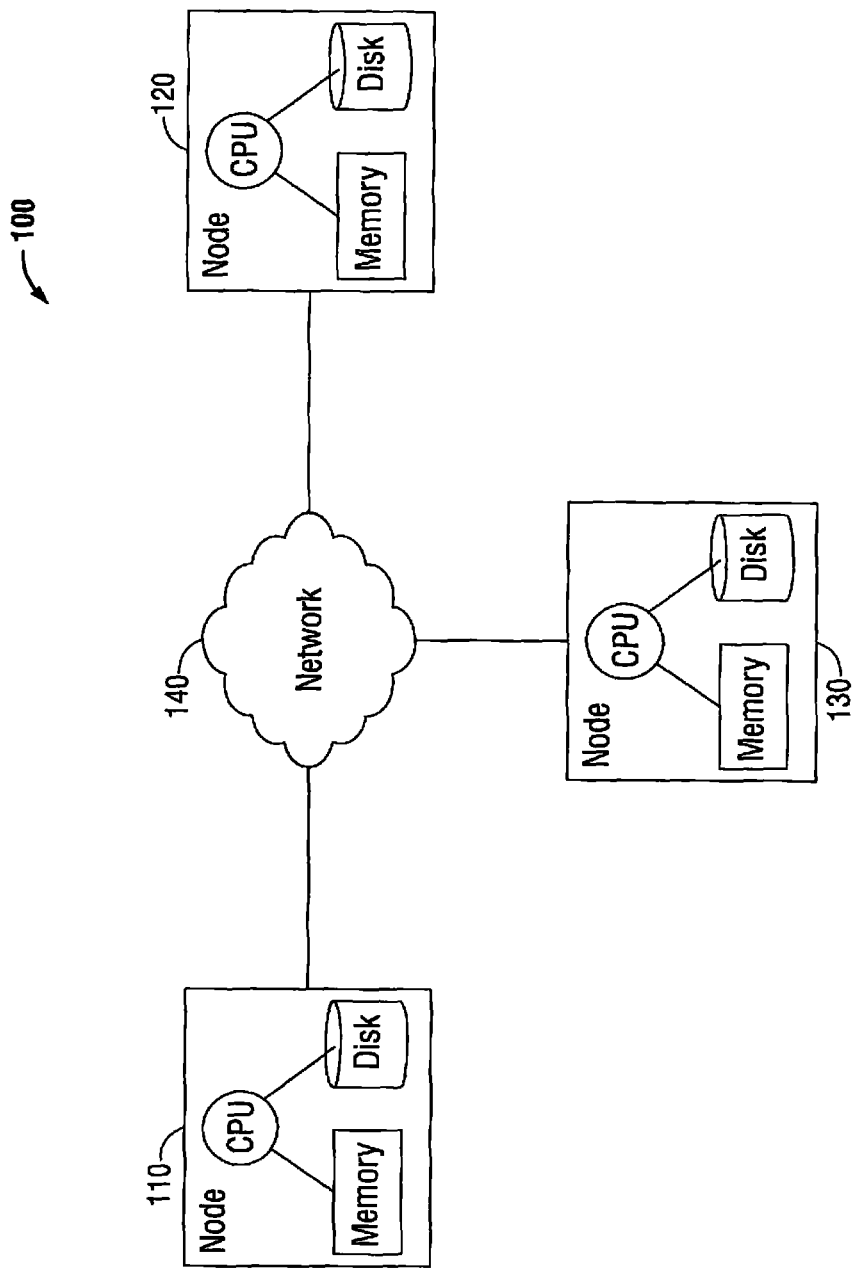
FIG. 1 is schematic representation of a stream processing system in accordance with an embodiment of the present disclosure.

Hereinafter, embodiments of the presently-disclosed methods and systems for fault-tolerant distributed stream processing are described with reference to the accompanying drawings. Like reference numerals may refer to similar or identical elements throughout the description of the figures.

As it is used herein, the term "computer" generally refers to anything that transforms information in a purposeful way. For the purposes of this description, the terms "software" and "code" should be interpreted as being applicable to software, firmware, or a combination of software and firmware. For the purposes of this description, "non-transitory" computer-readable media include all computer-readable media, with the sole exception being a transitory, propagating signal.

As it is used in this description, "batch" generally refers to a non-dividable unit of data. A batch may contain no data (an empty batch), a single datum or many data elements. Each batch in a stream may be assigned an identifier that uniquely names it within the stream. For purposes of illustration only, in the embodiments described herein, it is assumed that the values of batch identifiers in a stream are monotonically increasing. In alternative embodiments not shown the values of batch identifiers may be monotonically decreasing. In general, the values of batch identifiers may be realized as monotonically increasing or decreasing functions of some algorithm-dependent ordering. It is to be understood that the values of batch identifiers may be ordered in any suitable way.

Various embodiments of the present disclosure provide methods and systems for distributed stream processing fault recovery using stream subscriptions, and may eliminate the need for operator replicas, reduce resource requirements for replicating or persisting low-volume intermediate state, and/or eliminate the need for double transmission and double computation.

Embodiments of the presently-disclosed distributed stream processing fault recovery using stream subscriptions may be implemented as a computer process, a computing system or as an article of manufacture such as a pre-recorded disk or other similar computer program product or computer-readable media. The computer program product may be a non-transitory computer-readable storage media, readable by a computer system and encoding a computer program of instructions for executing a computer process.

The presently-disclosed methods and systems for distributed stream processing fault recovery using stream subscriptions push the synchronization in the receiver of an operator. In case of a failure the receiver re-subscribes into the stream at a particular location to continue the processing at the point left-off before the fault occurred.

FIG. 1 shows a schematic representation of a stream processing system (shown generally as 100) in accordance with an embodiment of the present disclosure that includes a plurality of computer nodes 110, 120 and 130 interconnected by a network 140. Each node 110, 120 and 130 may include one or more central processing units (CPUs), which may be coupled to memory and/or one or more disks or other storage. CPUs may include any type of computing device, computational circuit, or any type of processor or processing circuit capable of executing a series of instructions that are stored in a memory. CPUs may be adapted to run an operating system platform and application programs. Nodes may communicate with all other nodes over the network (also referred to herein as the "interconnect"), which may be the Ethernet or other computer networking technologies. Nodes execute operators of one or more stream processes which may be instantiated as a standard process. Memory may be random access memory (RAM), or any other form of memory, e.g., flash, static RAM (SRAM), dynamic RAM (DRAM), ROM (read-only memory), MRAM (magnetoresistive random access memory), EPROM or E2PROM.

Figure 2:
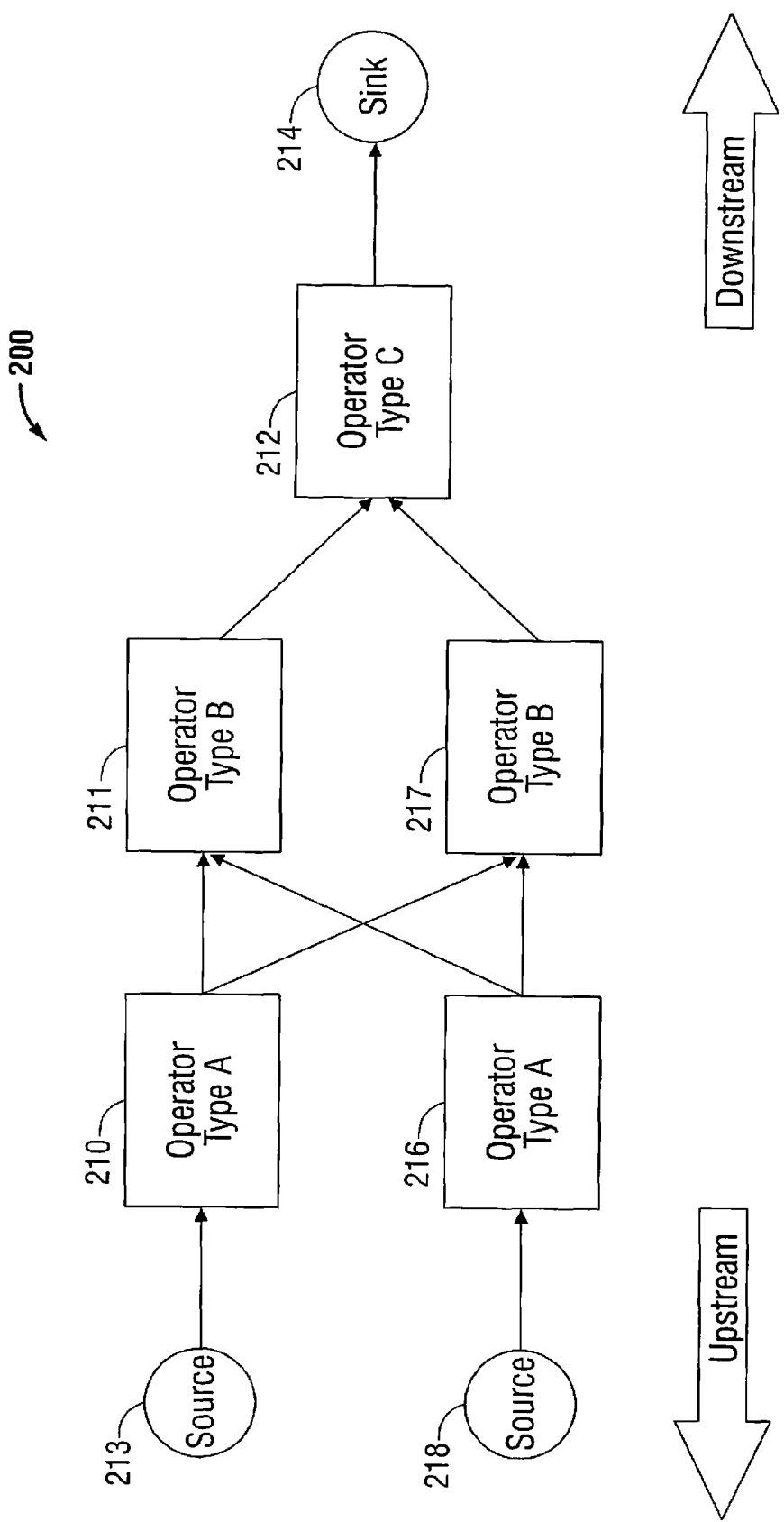
FIG. 2 schematically illustrates a stream process modeled as directed acyclic graph in accordance with an embodiment of the present disclosure.

FIG. 2 schematically illustrates a stream process (shown generally as 200) in accordance with an embodiment of the present disclosure. Data flow is indicated by an arrowed line with the arrowhead showing the direction of flow. For purposes of illustration only, in the embodiment illustrated in FIG. 2, stream process 200 includes three different types of operators, A, B and C. In some embodiments, an operator may be a source. Data flows from one or more input sources (e.g., two input sources 213 and 218) through a set of operators (e.g., five operators 210, 211, 212, 216 and 217) to one or more sinks (e.g., one sink 214), wherein the data flows from upstream operators to downstream operators. As illustrated in FIG. 2, data flows from each of two operators 210 and 216 of type A to two operators 211 and 217 of type B, and from each of the two operators 211 and 217 of type B to the operator 212 of type C. Stream process 200 does not have loops, and may be modeled as a directed acyclic graph (DAG).

One or more operators 210, 211, 212, 216 and 217 perform a computation over a "batch window" which may span one or more batches. A batch window has a unique identifier which may be derived from the smallest batch identifier covered by the window.

Operators 210, 211, 212, 216 and 217 may depend on multiple input streams to perform an operation. In the embodiments described herein, it is assumed that an operator identifies correlated events in multiple streams by an identical batch ID for the purposes of simplicity. An operator performs an operation over the input batch window once all batches from all input streams have arrived and computes an output result. The output result then gets forwarded to the next set of operators in the stream. The operator may assign a new batch ID for the output batch or can re-use the batch window ID (in the following description, for ease of explanation, it is assumed that the batch ID remains the same).

In some embodiments, stream process 200 contains a controller (e.g., controller 415 shown in FIG. 4), which may include one or more processes that manage the operators and/or infrastructure for the stream process 200 and/or stream processing system 100. The controller is configured to launch, monitor, and shutdown operators in a stream process. The controller is adapted to take corrective action, e.g., depending on a particular policy, in the event that an operator (or the machine on which the operator is executing) becomes unavailable.

Figure 3:
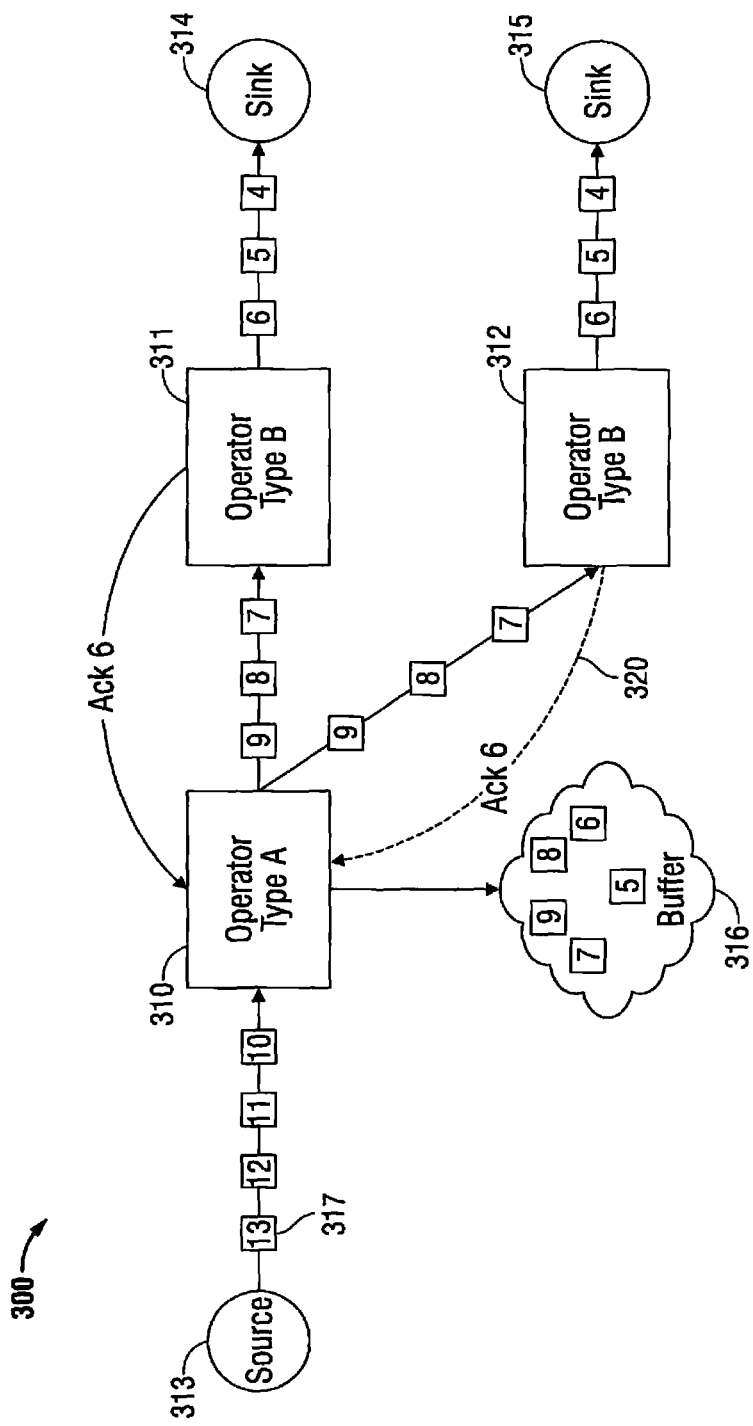
FIG. 3 schematically illustrates a stream process in accordance with an embodiment of the present disclosure that includes data flow broken-up into batches.

FIG. 3 schematically illustrates a stream process (shown generally as 300) wherein data flow is broken up into batches in accordance with an embodiment of the present disclosure. For purposes of illustration only, in the embodiment illustrated in FIG. 3, stream process 300 includes three operators, operator 310 of type A, operator 311 of type B, and operator 312 of type B. Operator 310 is subscribed to a data source 313 which transmits a continuous stream of data. The stream is broken up into batches 317 when it gets injected into the stream process 300 whereby each batch has a monotonically increasing identifier. Operator 310 may perform a transformation on each batch and send the results to operators 311 and 312. Operator 310 additionally stores the transmitted results in a local buffer 316, which may be main memory or disk, or to other storages, e.g., a node on the network, flash, and the like. The operators 311 and 312 may also perform an operation on the batch data and forward the computed result to their respective connected data sinks 314 and 315. Once the data has been successfully delivered to the data sinks (in this example batch number 6), both operators 311 and 312 acknowledge successful delivery to the operator 310 through an acknowledgement message 320. The acknowledgement message 320 tells operator 310 that data up to batch ID 6 has been successfully processed and delivered outside of the stream process. Operator 310 can therefore remove all stored intermediate results of the operator up to batch 6 from its local buffer 316.

A stream process which may include a plurality of chained operators may be started by instantiating all operators on the nodes in a connected cluster. Although the placement may have performance implications, the presently-disclosed methods for distributed stream processing fault recovery using stream subscriptions do not require specific placement. In some embodiments, each operator receives configuration parameters passed by the launching application through, for example, a configuration file or a central configuration manager or coordinator process. Examples of configuration parameters include without limitation the input stream or streams an operator should connect to, the operation the operator needs to perform, the batch ID in the stream the operator should start operating from, the configuration of downstream operators (e.g., the number or a list of names), and the behavior in case of a fault of an input stream (e.g., if the operator closes or the connection times out). Instantiation is typically performed by a coordinator node which orchestrates placement, but alternative models are envisioned, such as cost-based models where clients may bID for resources in the cluster.

In accordance with the presently-disclosed methods for distributed stream processing fault recovery using stream subscriptions, once started, each operator tries to use a locator service to determine the network addresses of all upstream operators and connects over the network, e.g., using a protocol such as the transmission control protocol (TCP), or other suitable communication protocol. When a connection is successfully established, the downstream operator sends a subscribe message to the upstream operator. In some embodiments, the subscribe message contains the stream identifier and/or the start batch ID. Based on the subscription batch ID, the upstream operator will start sending all of its output batches for the specific subscription in accordance with an ordering of the batch ID, e.g., lesser, equal or larger value batch ID. It is to be understood that the values of batch identifiers may be ordered in any suitable way.

In case of an operator failure (e.g., due to a node failure), a monitoring service determines the outage and starts a replacement operator. In some embodiments, the monitoring service may use a heartbeat protocol or may get notified by upstream or downstream operators which are connected to the failed operator.

In some embodiments, an operator can be reintegrated into a stream process in accordance with the process described below.

Step 1: Wait for downstream re-subscribe. If the operator is not connected to the final sink, then the operator waits for all downstream operators to re-subscribe and present the subscription batch ID. If the operator is connected to the final sink, then the operator needs to determine the last batch ID through other means, such as querying the output system or using a reliable persistent distributed storage system (e.g., utilizing the Paxos protocol or other suitable reliable storage systems). In the case where a reliable persistent distributed storage system is used, the process of the data sink needs to persist its state such that it can be recovered in case of a node failure. In cases where the operator is connected to a sink and another operator, e.g., in a Y-like configuration, the operator needs to determine the last batch ID for the sink and the last batch ID for the downstream operator.

Step 2: Subscribe upstream. Based on the set of subscription batch ids, the operator then subscribes to all of its upstream operators with a batch ID which is computed by min(set of subscription batchID) minus batch window size. The operators are found through the same location service as during startup. If the operator is the first operator in the stream, then it has no upstream operators to which to subscribe. Instead, it may receive data from an external source. In order to achieve reliability in a system where the data source does not provide a recovery mechanism, the system needs to maintain one or more redundant copies which could be replayed or the data may be lost for the period of the outage and the operator replays empty batches.

Step 3: Once the operator starts receiving the input batches, the operator resumes normal operation but only forwards batches to subscriptions with an equal or higher batch ID.

Step 4: Upon re-connection of a downstream operator in the case of a upstream operator outage, the downstream operator flushes all partial results and discards incomplete batches from the specific stream subscription. The operator only needs to discard those batches which were partially received. For example, in a stream process where a downstream operator B is connected to three upstream operators $A_1$, $A_2$, and $A_3$ and operator $A_3$ fails then B would re-subscribe to a new instance of $A_3$ and only discard and re-query the partial results from $A_3$, but not from operators $A_1$ and $A_2$ respectively.

Figure 4:
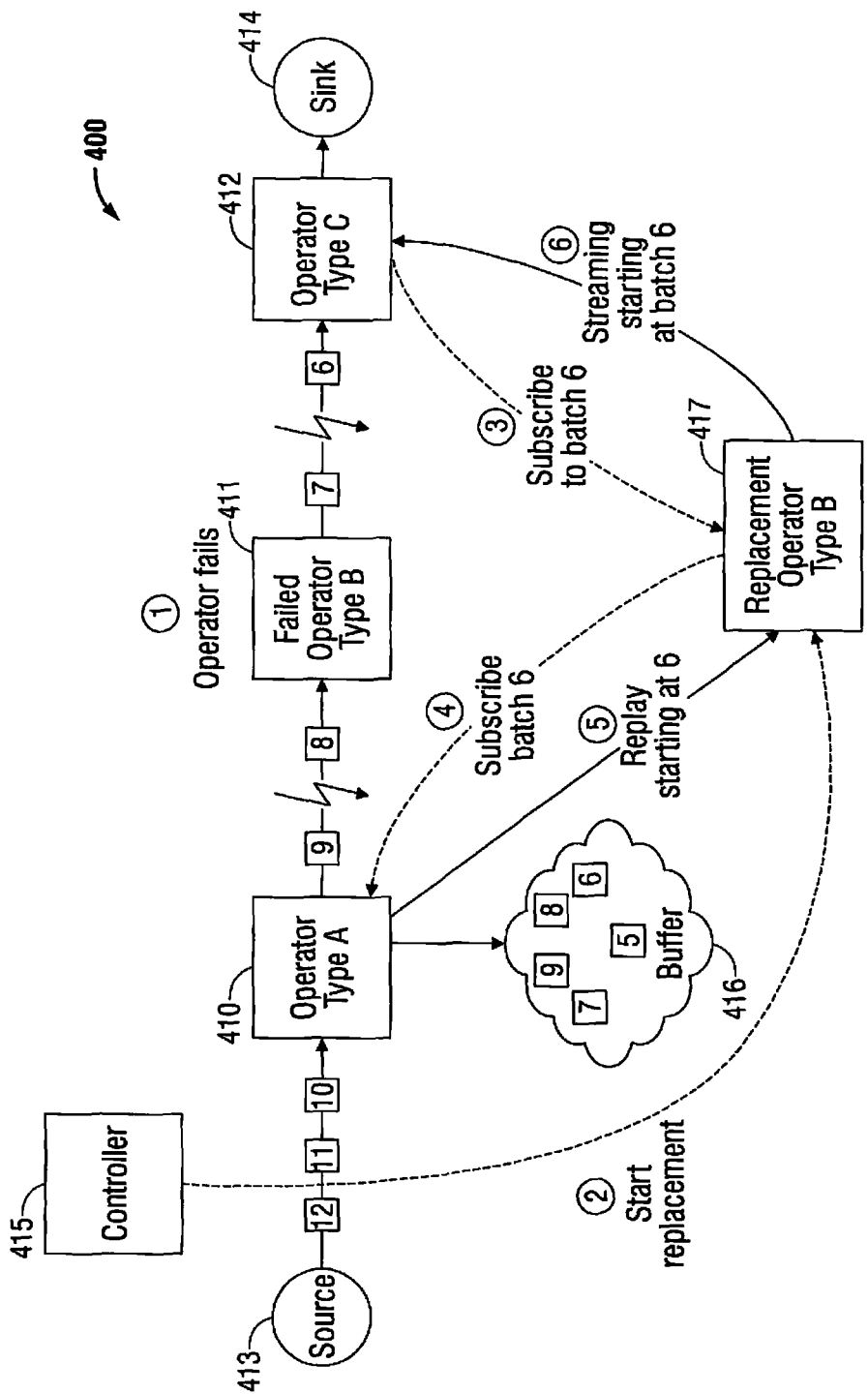
FIG. 4 schematically illustrates a stream process in accordance with an embodiment of the present disclosure that includes a failed operator and a replacement operator.

FIG. 4 schematically illustrates a stream process (shown generally as 400) in accordance with an embodiment of the present disclosure that includes a failed operator and illustrating the steps taken to restart a replacement operator and recover the stream process 400. For purposes of illustration only, in the embodiment illustrated in FIG. 4, stream process 400 includes three operators, operator 410 of type A which is connected to an external source 413, the failed operator 411 of type B, and operator 412 of type C which forwards results to an external sink 414. In step 1, the operator 411 fails and the controller 415 detects the outage. In step 2, the controller 415 starts a replacement operator 417 of type B, which takes over the function that the failed operator 411 was performing, after which the network address must be announced, e.g., published on the network. In some embodiments, the controller 415 publishes the network address of the replacement operator 417. In some embodiments, operator 411 (or other entity of stream process) may additionally, or alternatively, publish the network address of the replacement operator 417.

In step 3, operator 412 subscribes to the replacement operator 414 starting with batch number 6. In step 4, the replacement operator 417 now has determined that it needs to start its input stream at batch number 6 and subscribes to operator 410 with batch number 6. In step 5, operator 410 starts replaying the buffered data 416 starting at batch number 6. When operator 410 is caught up with the replay to the current batch ID, operator 410 will then start sending normal streaming data again.

In steady state operation, an operator waits for all upstream operators to deliver the batches and once the operator received all complete batches from all streams covering the batch window size the operator executes its operation. The operator then computes the result of the operation (also referred to herein as the "result set") and creates one output batch for each downstream operator, all output batches being stamped with the same batch ID.

The result set is transmitted to all subscribed downstream operators over the network. However, the operator does not discard the result batch but retains a copy, typically in memory or on disk (e.g., in case of memory pressure). The result batch is retained until the operator received a commit message for the batch from all downstream operators; only then it can discard the intermediate result. The operators connected to the sinks are the initiators of the commit message once they delivered a batch outside of the stream process.

Once the operator received all downstream commits it sends a commit to all upstream subscriptions for that particular stream, however, taking its window size into account. This chained buffering-and-commit approach ensures that intermediate data is always available in case of a failure of any of the operators. Each downstream operator can re-create its input set to resume the stream at the point of failure.

In typical workloads, the stream volume gets reduced very quickly, e.g., the first upstream operators often reduce the volume by multiple orders of magnitude. In such scenarios, the memory requirements for caching intermediate results for long periods of time may be substantial; yet is required to provide full restartability of a stream.

Instead of delaying the deletion of the intermediate cached values until the sink operator committed the output, an intermediate operator may create a replica (e.g., by replicating its intermediate result set to another node or nodes) and then performing an early commit of the upstream cached data. This way, operators in the stream can trade network performance and overhead for creating the replica against the memory consumption and potential disk access latencies upstream.

Upon restart of an operator using a replication mechanism and early commit, the operator needs to be aware of the replica and its location such that it can get the data upon request.

In the described reliability model, once an operator fails, the stream will stall processing until a replacement operator has been launched and re-integrated into the system. An alternative model to full data replay is to skip some of the batches in the stream, that is, consider them empty.

Typical usage scenarios for such an error handling approach are streams that compute approximations or sample data. For such workload, the partial loss of data may not or only marginally change the result.

Embodiments of the presently-disclosed methods and systems for distributed stream processing fault recovery using stream subscriptions extend the streaming protocol by a field which indicates whether the input stream was complete or not complete. This field is sticky and forwarded downstream once it was set in any of the batches of any input stream.

Using the field, operators may choose to compute partial results. For example, an operator computing the total count and an average of all values may choose to still report the average (over the available data set) while reporting the total count as undefined.

The system can recover from an operator failure if there exists a reverse path in the DAG representing the stream where all upstream edges in the graph starting from the failed operator are connected to a live operator or a restartable input source. If one of the upstream operators is dead then the rule has to be applied recursively.

A placement process may choose to maximize reliability of the overall system by placing the operators in such a way that the system can sustain the maximum number of failures due to node outages.

In order to reduce the recovery latency in case of a node failure, the system may instantiate standby operators which are not performing any operation, yet, are readily available to start integrating into the data flow. In case of an operator failure, a standby operator is chosen as the replacement of the failed operator. The integration process into the stream process is similar to the process in the case of an operator failure described above, and further description thereof is omitted in the interests of brevity.

Standby operators can come in two flavors: typed and untyped. A typed standby operator can only take one specific personality (e.g., an aggregator but not a join operator) while an untyped operator can take any personality. The advantage of a typed operator is that if the operator has a high initialization overhead then the time it takes to prepare the operator for operation is shortened by the preparation time. However, an untyped operator can take any personality and a stream process with many different types of operators may require an unnecessary large number of standby operators.

Figure 5:
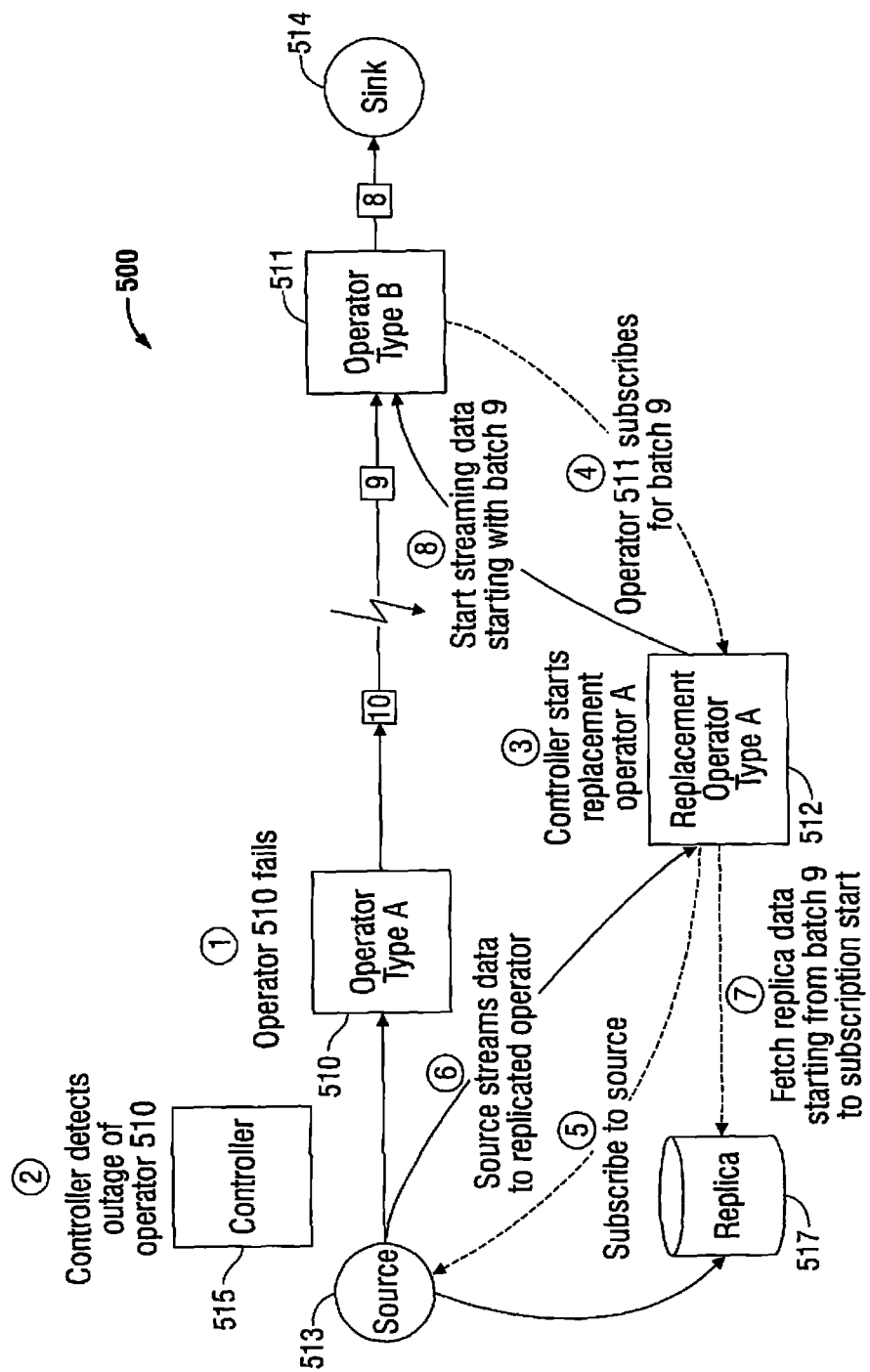
FIG. 5 schematically illustrates a stream process in accordance with an embodiment of the present disclosure that includes a failed operator directly connected to a source and an input replica that records the input data to persistent storage.

FIG. 5 schematically illustrates a stream process (shown generally as 500) in accordance with an embodiment of the present disclosure which has a failing operator that is directly connected to a source with no mechanism for replaying missed data and an additional input replica which records the input data to, for example, to persistent storage. For purposes of illustration only, in the embodiment illustrated in FIG. 5, stream process 500 includes two operators, operator 510 of type A connected to an external source 513 and operator 511 of type B. The stream process 500 may additionally contain an input replica 517 which also receives the data but only stores it, e.g., to disk.

As shown in FIG. 5, in step 1, the operator 510 of type A fails. In step 2, the controller 515 detects or otherwise determines the outage of operator 510. In step 3, the controller 515 starts a replacement operator 512 of type A and publishes the network address of the replacement operator 512. In step 4, the operator 511 subscribes to the replacement operator 512 starting with the last incomplete batch ID, represented arbitrarily as batch number 9. In step 5, the replacement operator 512 connects to the external source 513 and determines the current batch ID from the source 513. In step 6, the external source 513 starts streaming the data to the replacement operator 512, and the replacement operator 512 determines the current batch ID from data transmitted by the source 513.

Replacement operator 512 starts buffering the incoming data. In step 7, the replacement operator 512 fetches all missed data from the replica 517 starting with the batch subscription number given by operator 511 up to the first batch ID the replacement operator 512 received from the external sink 514. Replacement operator 512 reprocesses the missed batches from the data provided by the replica 517 and then starts normal operation.

Figure 6:
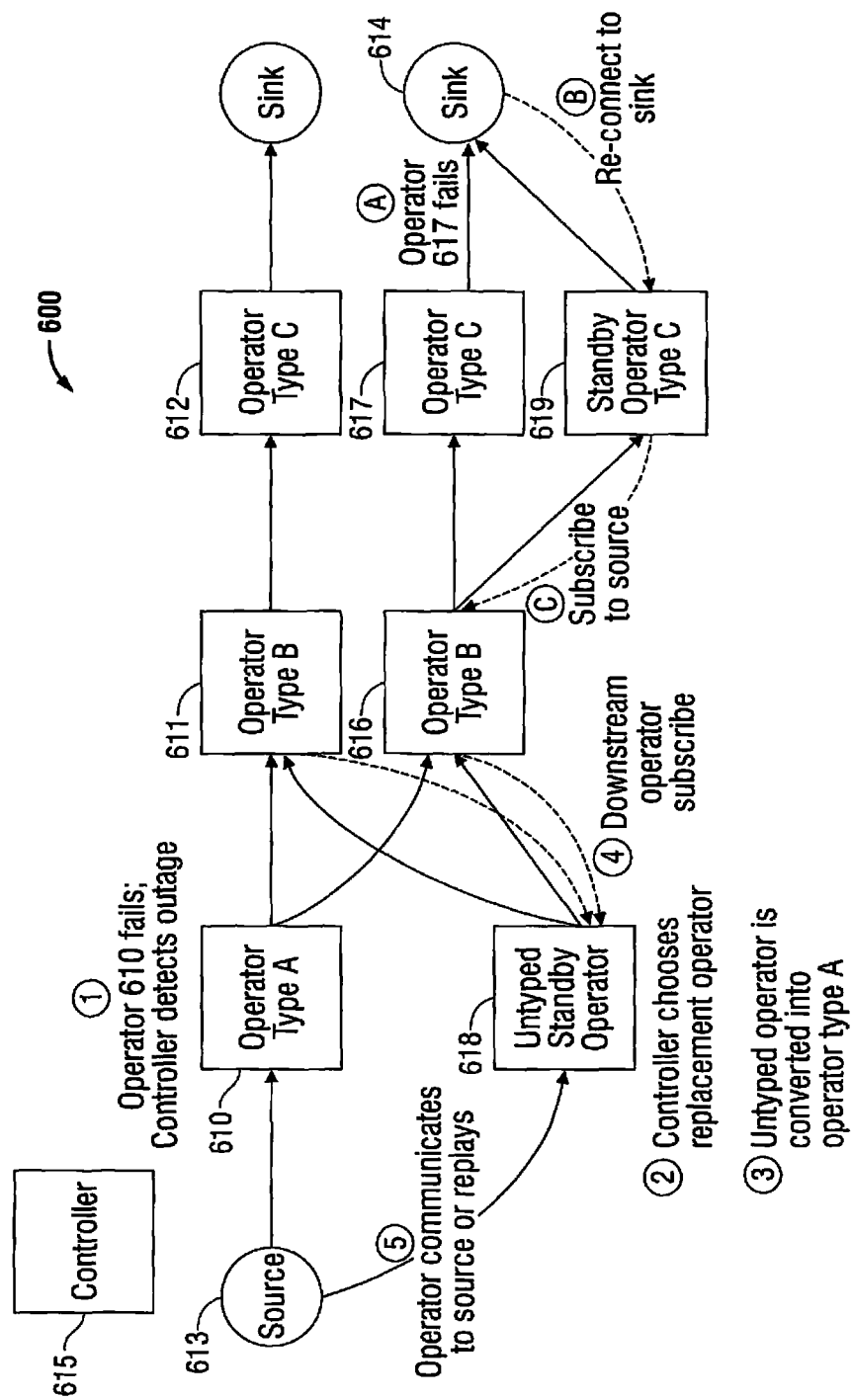
FIG. 6 schematically illustrates a stream process and an optimization method for restarting failed operators in accordance with an embodiment of the present disclosure.

FIG. 6 schematically illustrates a stream process (shown generally as 600) including an optimization method for restarting failed operators in accordance with an embodiment of the present disclosure. The presently-disclosed optimization method reduces the recovery time by utilizing standby operators. For purposes of illustration only, in the embodiment illustrated in FIG. 6, stream process 600 includes seven operators, a failed operator 610 of type A, operators 611 of type B, operators 612 and 617 of type C, an untyped standby operator 618, and a standby operator 619 of type C.

In step 1, operator 610 fails and the controller 615 detects or otherwise determines the outage. In step 2, the controller 615 chooses the untyped standby operator 618 as the replacement operator for the failed operator 610.

In step 3, the controller 615 initiates a conversion of the untyped standby operator 618 into an operator of type A. The conversion may include deploying the code of operator A onto the node. Once the conversion is completed, the network address of the replacement operator 618 of type A is published on the network. In some embodiments, the controller 615 publishes the network address of the replacement operator 618. the network address of the replacement operator 618 may be published by any suitable entity of stream process.

In step 4, operators 611 and 616 subscribe to the replacement operator 618. In step 5, the replacement operator 618 connects to the source 613 and starts normal operation.

In an alternative embodiment of the optimization method, it is not necessary to convert the untyped standby operator 618. In step A, the operator 617 fails, the controller 615 detects or otherwise determines the outage of operator 617 and chooses standby operator 619 of type C as a replacement operator. In step B, the replacement operator 619 connects to the sink 614 and determines the last successfully delivered batch ID. In step C, replacement operator 619 subscribes to operator 616 and starts normal operation.

Hereinafter, a method of processing streaming data in an operator which is part of a stream process in accordance with the present disclosure is described with reference to FIGS. 7A and 7B. It is to be understood that the steps of the method provided herein may be performed in combination and in a different order than presented herein without departing from the scope of the disclosure.

Figure 7A:
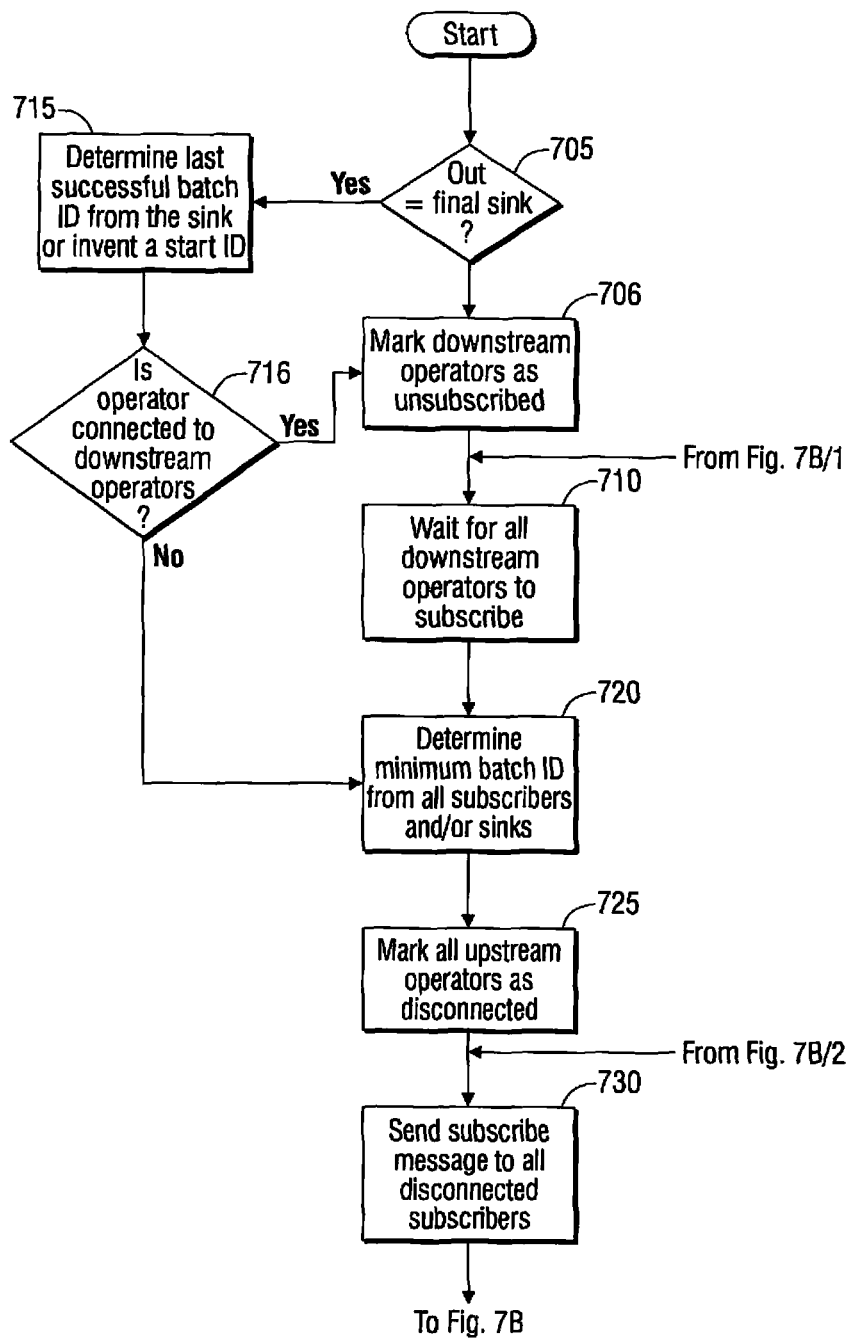
FIGS. 7A and 7B are flowcharts illustrating the execution flow for an operator without failure handling in accordance with an embodiment of the present disclosure.
Figure 7B:
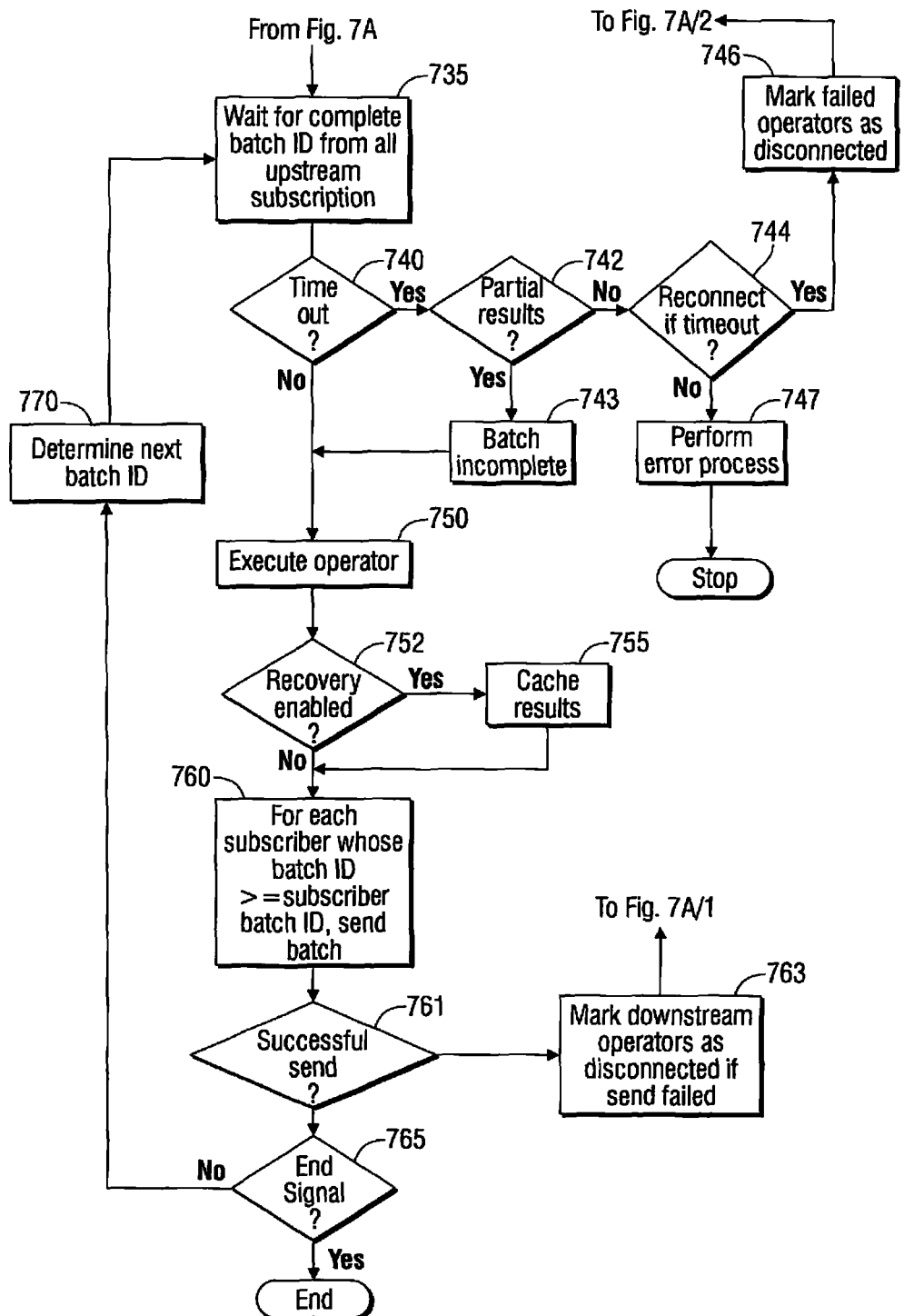

FIGS. 7A and 7B are flowcharts illustrating the execution flow for an operator without failure handling in accordance with an embodiment of the present disclosure. In step 705, the operator determines if it is connected to one or more final sinks, or if it is connected to other downstream operators. If it is determined that the operator is connected to one or more final sinks, then in step 715 the operator determines the last successful batch ID from the sink (e.g., by querying a database), or the operator invents a start ID, e.g., based on the current time.

In step 716, it is determined if the operator is also connected to one or more downstream operators. If it is determined, in step 716, that the operator is also connected to one or more downstream operators, then, in step 706, the operator marks all (if any) downstream subscriptions as unsubscribed and, in step 710, the operator waits for all downstream operators to subscribe to the operator and stores the subscription batch ID for each downstream operator. If it is determined, in step 716, that the operator is not connected to downstream operator(s), then, in step 720, the operator determines the minimum batch ID for all subscribers which is used for upstream subscription. In some embodiments, the minimum batch ID is determined from the subscription of downstream operators and/or sinks.

In accordance with embodiments of the present disclosure, each operator maintains a set of upstream operators and/or upstream sources to which the operator is connected. In step 725, the operator marks all upstream connections to operators as disconnected. In step 730, the operator subscribes to all upstream operators using the batch ID determined in step 715 or step 720.

Turning to FIG. 7B, in step 735, the operator waits for all batch data for the next batch ID from all upstream subscriptions and/or data sinks. The operator may be configured with a timeout of the receive function. In step 740, the operator checks to determine if a timeout occurred. If it is determined, in step 740, that a timeout occurred, then, in step 742, the operator checks to determine if it is configured to execute even if only partial upstream data is available and, if so, in step 743, marks the batch as incomplete. If it is determined that the operator is not configured to execute if only partial upstream data is available, then, in step 744, the operator checks the configuration to determine if the operator should re-connect to upstream operators in case of a timeout. If the operator is not configured to re-connect to upstream operators in case of a timeout, then, in step 747, the operator reports an error condition and stops execution. Alternatively, if the operator is configured to re-connect to upstream operators in case of a timeout, the operator, in step 746, marks all those operators as disconnected which timed out during the batch data reception (in step 735) and, returning to step 730 (FIG. 7A), the operator subscribes to all upstream operators using the batch ID determined in step 715 or step 720.

If it is determined, in step 740, that a timeout occurred, then, in step 750, the operator executes and processes the data. In step 752, the operator checks to determine if it is configured for data recovery in case of failure. If it is determined, in step 752, that the operator is not configured for failure recovery, then, in step 755, the operator executes and caches the results for later retransmission and, in step 760, the operator forwards the results of the processing to all those downstream operators whose subscription batch ID is larger or equal to the currently processed batch ID.

If it is determined, in step 752, that the operator is configured for failure recovery, then, in step 760, the operator forwards the results of the processing to all those downstream operators whose subscription batch ID is larger or equal to the currently processed batch ID. In step 761, the operator determines if one or more of the downstream operators were unable to receive the data. If it is determined, in step 752, that downstream operator(s) were unable to receive the data, then, in step 763, the operator marks the downstream operators determined in step 761 as unsubscribed. In step 765, the operator determines if the end of the data stream has been signaled (e.g., as part of the message or an outside signal). If it is determined, in step 765, that the end has not been signaled, then, in step 770, the operator determines the next batch ID and then continues in step 740. If it is determined, in step 765, that the end has been signaled, then the operator terminates.

Figure 8:
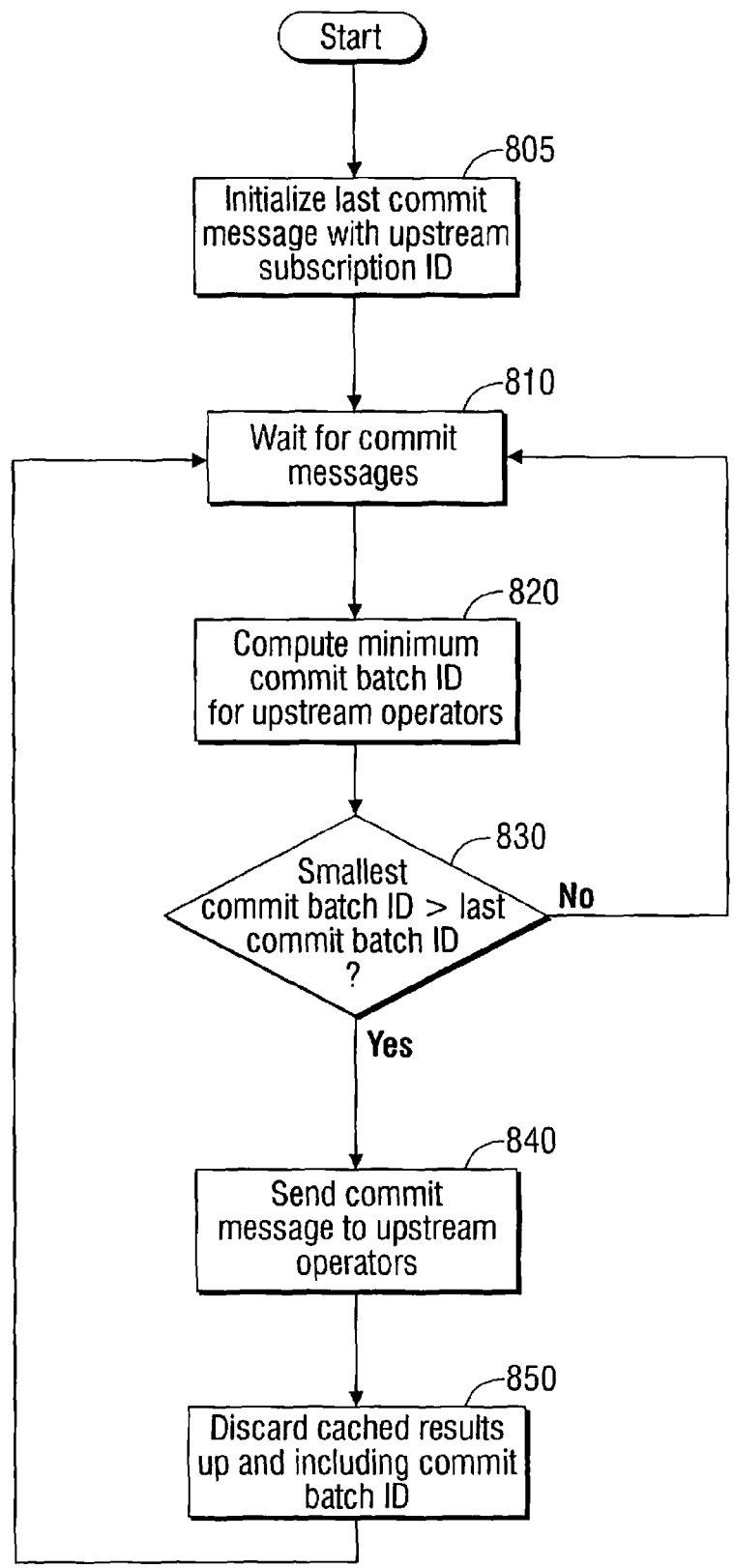
FIG. 8 is a flowchart illustrating a method of acknowledging data reception and processing from downstream operators to upstream operators in accordance with an embodiment of the present disclosure.

FIG. 8 is a flowchart illustrating a method of acknowledging data reception and processing from downstream operators to upstream operators in accordance with an embodiment of the present disclosure. In step 805, the operator initializes the last commit message ID with the upstream subscription ID. In step 810, the operator waits for commit messages from its downstream operators. In step 820 the operator computes the smallest commit batch ID based on all previously received and new messages. In step 830, the operator compares the smallest commit batch ID to the last sent commit batch ID and if it is the smaller or the same it continues in step 810. If the computed smallest commit batch ID is larger than the last previously-sent commit batch ID, then in step 840, the operator sends commit messages to all upstream operators using the computed smallest commit batch ID. In step 850, the operator discards any cached intermediate data up and including the computed smallest commit batch ID.

Hereinafter, a method of reconfiguring a stream process in a distributed system in accordance with the present disclosure is described with reference to FIG. 9. It is to be understood that the steps of the method provided herein may be performed in combination and in a different order than presented herein without departing from the scope of the disclosure. Embodiments of the presently-disclosed method of reconfiguring a stream process in a distributed system and method for management of a stream processing system may be implemented as a computer process, a computing system or as an article of manufacture such as a pre-recorded disk or other similar computer program product or computer-readable media. The computer program product may be a non-transitory, computer-readable storage media, readable by a computer system and encoding a computer program of instructions for executing a computer process.

Figure 9:
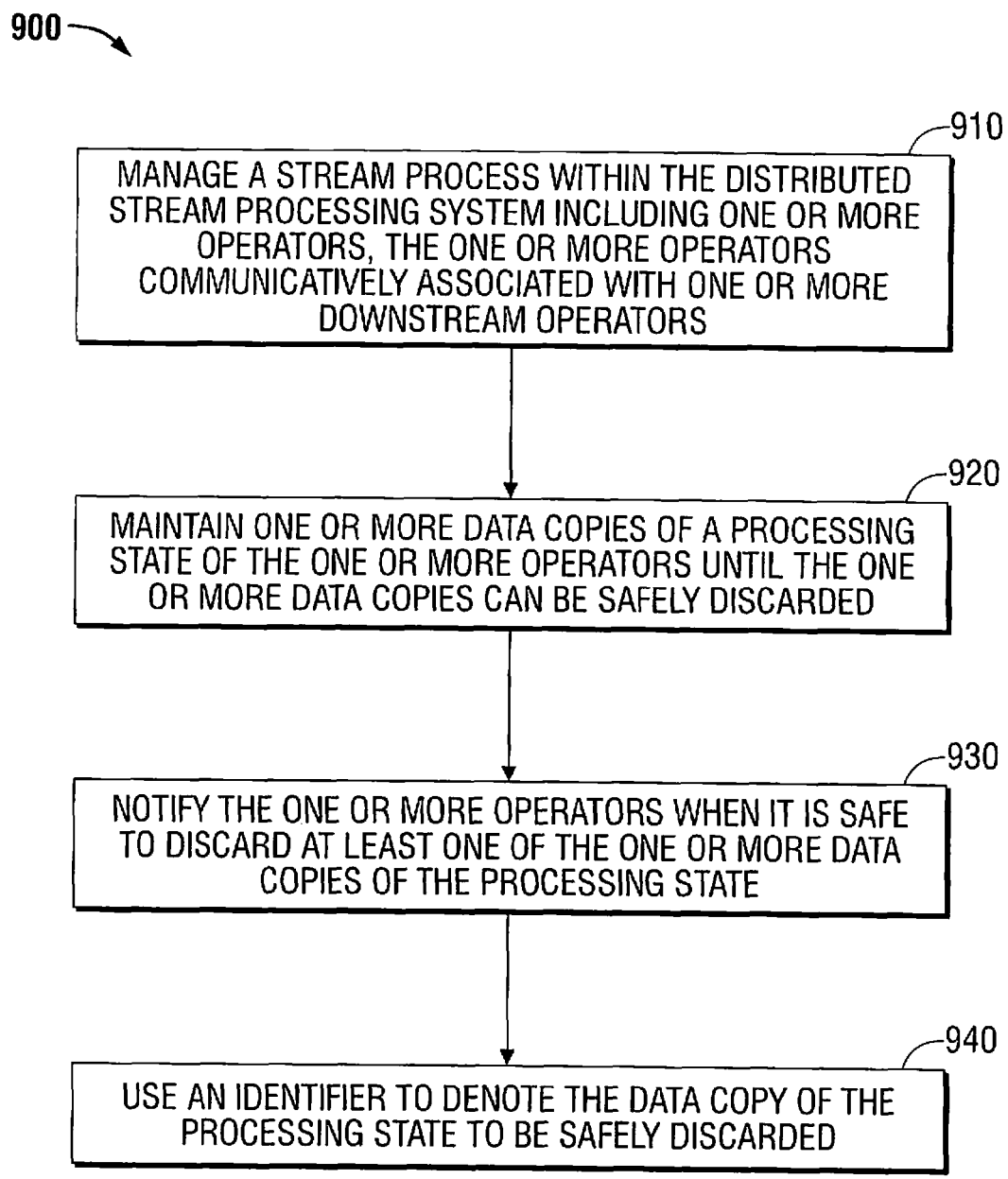
FIG. 9 is a flowchart illustrating a method of achieving fault tolerance in a distributed stream processing system in accordance with an embodiment of the present disclosure.

FIG. 9 is a flowchart illustrating a method (shown generally as 900 in FIG. 9) of achieving fault tolerance in a distributed stream processing system in accordance with an embodiment of the present disclosure. In step 910, a stream process within the distributed stream processing system including one or more operators is managed. The one or more operators are communicatively associated with one or more downstream operators. The stream process uses a data batch to define a set of values. A data batch may include none or one or more values.

In step 920, one or more data copies of a processing state of the one or more operators is maintained until the one or more data copies can be safely discarded. In some embodiments, the one or more operators cache the processing state until the one or more downstream operators have notified the one or more operators of successful processing of the data batch.

In some embodiments, the one or more operators cache the processing state according to a partition function until the one or more downstream operators subscribe to the one or more operators and the partition function has notified the one or more operators of successful processing of the data batch, e.g., using a commit message. The one or more operators may generate one or more additional data copies of the processing state and may cache the one or more additional data copies and may send the commit message before the one or more operators receive commit messages from the one or more downstream operators. A network protocol may be used to notify the one or more operators of successful processing of the data batch.

In step 930, the one or more operators are notified when it is safe to discard at least one of the one or more data copies of the processing state.

In step 940, an identifier is used to denote the data copy of the processing state to be safely discarded.

The above-described method (shown generally as 900 in FIG. 9) of reconfiguring a stream process in a distributed system may further include the step of using a controller process to detect failure of the one or more operators and to start one or more replacement operators. In some embodiments, the one or more downstream operators continue processing and forwarding partial data until the one or more replacement operators are started upon a failure of the one or more operators. In some embodiments, the one or more operators only start processing when the one or more downstream operators have successfully subscribed to the one or more operators.

In some embodiments, the one or more operators determine an upstream processing identifier using the subscription identifiers used by the one or more downstream operators to subscribe to the one or more operators. The one or more operators may use the smallest downstream subscription identifier for determining the upstream subscription identifier. In some embodiments, the one or more operators use the current time to determine the upstream subscription identifier.

The above-described method of reconfiguring a stream process in a distributed system may further include the step of waiting for the one or more downstream operators subscribed to the one or more operators to determine an upstream subscription identifier for the one or more replacement operators. In some embodiments, the one or more downstream operators notify the controller process of a failure of the one or more operators. In some embodiments, the one or more downstream operators may flush any partial data upon a failure of the one or more operators, and one or more replacement operators transmit the processing state.

The above-described method of reconfiguring a stream process in a distributed system may further include the step of using a controller process to launch one or more standby operators in case a failure of the one or more operators. In some embodiments, the one or more standby operators are preloaded with a program or data for a predetermined operator type. In some embodiments, the one or more standby operators install a program or data in a configuration step.

Although embodiments have been described in detail with reference to the accompanying drawings for the purpose of illustration and description, it is to be understood that the inventive processes and systems are not to be construed as limited thereby. It will be apparent to those of ordinary skill in the art that various modifications to the foregoing embodiments may be made without departing from the scope of the disclosure.

What is claimed is:

1. A method of achieving fault tolerance in a distributed stream processing system including a plurality of computer nodes organized as a directed acyclic graph, wherein at least a portion of the plurality of computer nodes performs the method comprising the steps of:

managing a stream process within the distributed stream processing system including at least one operator executed by a computer node in the directed acyclic graph, the at least one operator communicatively associated with at least one downstream operator executed by a computer node in the directed acyclic graph;

maintaining at least one data copy of a processing state of the at least one operator until the at least one data copy can be safely discarded;

notifying the at least one operator when it is safe to discard at least one of the at least one data copy of the processing state; and using an identifier to denote the data copy of the processing state to be safely discarded, wherein the at least one operator forwards the at least one data copy in one or more batches and forwards the one or more batches to the at least one downstream operator having an equal or higher batch ID.

2. The method of claim 1, wherein the stream process uses a data batch to define a set of values.

3. The method of claim 2, wherein the at least one operator caches the processing state until the at least one downstream operator has notified the at least one operator of successful processing of the data batch.

4. The method of claim 2, wherein the at least one operator caches the processing state according to a partition function until the at least one downstream operator subscribes to the at least one operator and the partition function has notified the at least one operator of successful processing of the data batch using a commit message.

5. The method of claim 4, wherein the at least one operator generates at least one additional data copy of the processing state and caches the additional data copy and sends the commit message before the at least one operator receives commit messages from the at least one downstream operator.

6. The method of claim 2, wherein a network protocol is used to notify the at least one operator of successful processing of the data batch.

7. The method of claim 1, further comprising the step of using a controller process to detect failure of the at least one operator and start at least one replacement operator.

8. The method of claim 7, further comprising the step of waiting for the at least one downstream operator subscribed to the at least one operator to determine an upstream subscription identifier for the at least one replacement operator.

9. The method of claim 8, wherein the at least one operator determines an upstream processing identifier using the subscription identifiers used by the at least one downstream operator to subscribe to the at least one operator.

10. The method of claim 9, wherein the at least one operator uses the smallest downstream subscription identifier for determining the upstream subscription identifier.

11. The method of claim 7, wherein the at least one downstream operator notifies the controller process of a failure of the at least one operator.

12. The method of claim 7, wherein the at least one downstream operator flushes any partial data upon a failure of the at least one operator and the at least one replacement operator transmits the processing state.

13. The method of claim 7, wherein the at least one downstream operator continues processing and forwarding partial data until the at least one replacement operator is started upon a failure of the at least one operator.

14. The method of claim 1, further comprising the step of using a controller process to launch at least one standby operator in case of a failure of the at least one operator.

15. The method of claim 14, wherein the at least one standby operator is preloaded with a program or data for a predetermined operator type.

16. The method of claim 14, wherein the at least one standby operator installs a program or data in a configuration step.

17. The method of claim 1, wherein the at least one operator only starts processing when the at least one downstream operator has successfully subscribed to the at least one operator.

18. The method of claim 17, wherein the at least one operator uses the current time to determine the upstream subscription identifier.

19. A stream processing system comprising:
a plurality of computer nodes modeled as a directed acyclic graph,
at least a portion of the nodes of the plurality of computer nodes configured to manage a stream process within the stream processing system including at least one operator executed by a computer node, the at least one operator communicatively associated with at least one downstream operator executed by a computer node, the controller being configured to:
maintain at least one data copy of a processing state of the at least one operator in a computer node until the at least one data copy can be safely discarded;
notify the at least one operator in a computer node when it is safe to discard at least one of the at least one data copy of the processing state; and
use an identifier to denote the data copy of the processing state to be safely discarded;
wherein the at least one operator forwards the at least one data copy in one or more batches and forwards the one or more batches to the at least one downstream operator having an equal or higher batch ID.

* * * * *